United States Patent
Dolgov et al.

(10) Patent No.: US 11,366,194 B2
(45) Date of Patent: Jun. 21, 2022

(54) METHOD FOR PROVIDING AND IMPROVING A POSITIONAL PROBABILITY DISTRIBUTION FOR GNSS RECEIVED DATA

(71) Applicant: Robert Bosch GmbH, Stuttgart (DE)

(72) Inventors: Maxim Dolgov, Renningen (DE); Thomas Michalke, Weil der Stadt (DE); Florian Wildschuette, Hildesheim (DE); Hendrik Fuchs, Hildesheim (DE); Ignacio Llatser Marti, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 276 days.

(21) Appl. No.: 16/632,003

(22) PCT Filed: Jun. 15, 2018

(86) PCT No.: PCT/EP2018/066016
§ 371 (c)(1),
(2) Date: Jan. 17, 2020

(87) PCT Pub. No.: WO2019/015897
PCT Pub. Date: Jan. 24, 2019

(65) Prior Publication Data
US 2020/0233056 A1    Jul. 23, 2020

(30) Foreign Application Priority Data
Jul. 21, 2017   (DE) .......................... 102017212603.5

(51) Int. Cl.
*G01S 19/40*    (2010.01)
*G01S 5/00*     (2006.01)
(Continued)

(52) U.S. Cl.
CPC ............ *G01S 5/0072* (2013.01); *B61L 23/34* (2013.01); *G01S 19/40* (2013.01); *G01S 19/45* (2013.01); *G01S 19/51* (2013.01); *H04W 4/46* (2018.02)

(58) Field of Classification Search
CPC ........ G01S 5/0072; G01S 19/40; G01S 19/45; G01S 19/51; H04W 4/46
See application file for complete search history.

(56) References Cited

U.S. PATENT DOCUMENTS 8,423,289 B2 *  4/2013  Kagawa ................. G01S 19/51
                                                      701/412
9,632,182 B2 *  4/2017  Oh ......................... G01S 19/07
(Continued)

FOREIGN PATENT DOCUMENTS

DE   102009041586 A1   4/2011
DE   102016004370 A1   2/2017
WO      2011128739 A1  10/2011

OTHER PUBLICATIONS

International Search Report for PCT/EP2018/066016, dated Aug. 30, 2018.

*Primary Examiner* — Peter D Nolan
*Assistant Examiner* — Anwar Mohamed
(74) *Attorney, Agent, or Firm* — Norton Rose Fulbright US LLP; Gerard Messina

(57) ABSTRACT

A method is provided for correcting a positional probability distribution, at least two mobile systems each ascertaining a positional probability distribution through respective GNSS receivers, at least one mobile system ascertaining a distance to at least one second mobile system, the at least two mobile systems exchanging the ascertained positional probability distribution among themselves through a communication link, and by using the at least two ascertained positional probability distributions and the distance between the at
(Continued)

least two mobile systems, an improvement of the positional probability distributions being calculated. Furthermore, a method for providing at least one correction term is provided.

11 Claims, 2 Drawing Sheets

(51) Int. Cl.
*H04W 4/46* (2018.01)
*B61L 23/34* (2006.01)
*G01S 19/45* (2010.01)
*G01S 19/51* (2010.01)

(56) References Cited

U.S. PATENT DOCUMENTS

| | | | | |
|---|---|---|---|---|
| 11,096,008 | B1* | 8/2021 | Batten | H04W 4/185 |
| 11,187,534 | B2* | 11/2021 | Knutson | G01C 21/3804 |
| 2006/0158373 | A1* | 7/2006 | Kamei | G01S 19/43 |
| | | | | 342/357.41 |
| 2010/0164789 | A1* | 7/2010 | Basnayake | G01S 19/43 |
| | | | | 342/357.23 |
| 2011/0054790 | A1* | 3/2011 | Kagawa | G01S 5/0072 |
| | | | | 701/472 |
| 2012/0089319 | A1* | 4/2012 | Basnayake | G01S 19/03 |
| | | | | 701/300 |
| 2012/0116677 | A1* | 5/2012 | Higgison | G01S 5/0236 |
| | | | | 701/518 |
| 2013/0030687 | A1* | 1/2013 | Shida | G01S 7/41 |
| | | | | 701/301 |
| 2013/0093618 | A1* | 4/2013 | Oh | G01S 5/0072 |
| | | | | 342/357.44 |
| 2014/0088863 | A1* | 3/2014 | Hara | G01C 21/30 |
| | | | | 701/445 |
| 2016/0018527 | A1* | 1/2016 | Oh | G01S 19/45 |
| | | | | 701/468 |
| 2016/0313450 | A1* | 10/2016 | Jordan | G01S 19/40 |
| 2016/0327653 | A1* | 11/2016 | Humphreys | G01S 19/48 |
| 2016/0350906 | A1* | 12/2016 | Meier | G06T 17/10 |
| 2017/0038477 | A1* | 2/2017 | Schmid | G01S 19/48 |
| 2018/0091962 | A1* | 3/2018 | Hernandez | H04W 4/02 |
| 2018/0180708 | A1* | 6/2018 | Vijaya Kumar | G01S 19/51 |
| 2019/0016339 | A1* | 1/2019 | Ishioka | B60W 50/0097 |
| 2019/0120970 | A1* | 4/2019 | Vigen | H04K 3/90 |
| 2019/0154439 | A1* | 5/2019 | Binder | G01S 15/08 |
| 2019/0271550 | A1* | 9/2019 | Breed | G08G 1/096725 |
| 2020/0180626 | A1* | 6/2020 | Mizoguchi | B60W 10/18 |
| 2021/0215485 | A1* | 7/2021 | Ishigami | G01S 19/33 |

* cited by examiner

METHOD FOR PROVIDING AND IMPROVING A POSITIONAL PROBABILITY DISTRIBUTION FOR GNSS RECEIVED DATA

FIELD

The present invention relates to a method for correcting a positional probability distribution and a method for providing at least one correction term.

BACKGROUND INFORMATION

A precise position determination is necessary for a plurality of applications. For example, the position must be extremely accurately determinable in aerospace technology, and also for autonomous vehicles. However, the standard mode of the GNSS (Global Navigation Satellite System) available for civilians, like the global positioning system (GPS) enables a relatively poor lateral accuracy of approximately 13 m and a vertical accuracy of approximately 22 m.

In aviation, for example, two GNSS receivers, which are offset from one another, are used to increase the accuracy of the position determination. For this purpose, one GNSS receiver is situated at the front of the plane and one GNSS receiver is situated at the tail, and the accuracy of the position determination is optimized on the basis of the fixed and known distance of the GNSS receivers.

Furthermore, the accuracy of the position determination may be improved by a differential GPS (DGPS). A DGPS station, whose position has been measured in advance, transmits locally applicable correction signals with correction terms. Errors, which arise due to clock drift of the satellites or due to atmospheric influences, may thus be compensated. The DGPS services are, however, generally fee-based and require a receiving device provided for this purpose.

SUMMARY

An object of the present invention is to improve the accuracy of position measurements without additional hardware and providing this improvement.

This object may be achieved in accordance with an example embodiment of the present invention. Advantageous embodiments of the present invention are described herein.

According to one aspect of the present invention, a method is provided for correcting a positional probability distribution. In a first step, positional probability distributions are ascertained by at least two mobile systems with a respective GNSS receiver for the at least two mobile systems. In another step, a distance is ascertained of the at least two mobile systems to one another. The at least two mobile systems may exchange the ascertained positional probability distribution between one another through a communication link. Subsequently, an improvement of the positional probability distributions may be carried out by using the at least two ascertained positional probability distributions and the distance between the at least two mobile systems.

By ascertaining a fixed or a changeable distance between a moveable object, such as a vehicle, for example, and another moveable or stationary object, the distance may be used as a more accurate reference value for comparing or adjusting a positional probability distribution. A GNSS-based localization may thereby be improved by exchanging, for example, vehicle-to-vehicle data. In particular, different data, ascertained from one vehicle or multiple vehicles, such as distances, for example, to other road users, distance of multiple vehicles to an object with an unknown position or to public objects with a known position, may be used to optimize the position determination of the vehicle or of the mobile system. The sensors already available in the mobile system and GNSS receivers may thereby be used for localizing and improving the positional ascertainment. Additional hardware, for example, using DGPS, is thus not necessary.

To carry out the method, each vehicle has a local estimation of its position in the form of a probability distribution. The position in the form of a probability distribution is the positional probability distribution, which was ascertained on the basis of GNSS measurements previously carried out by the mobile system. To ascertain the positional probability distribution, other sensors of the mobile system, such as, for example, distance sensors or acceleration sensors, may also be used in a supporting way. As soon as a communication link was able to be established between multiple mobile systems, the mobile systems exchange their position estimations, including the estimated clock drifts, and also the measured GNSS signals to the observed satellites. The GNSS signals or measurements may have, for example the three-dimensional positions, point in time at which the signal was transmitted, and also the local receive time of the mobile system. The sensor data ascertained by each mobile system may likewise be transmitted via the communication link. For example, the mobile systems may respectively ascertain a distance from one to another and subsequently exchange it among one another. In this way, individual measurement uncertainties of one sensor may be compensated. The distance between the mobile systems may also be ascertained by a first mobile system and transmitted to the other or to the second mobile system. The exchanged or transmitted data may subsequently be used, together with the ascertained positional probability distributions of each mobile system in order to calculate a correction term for correcting or optimizing positional probability distributions. In another step, the ascertained correction term may be applied to subsequent calculations or measurements of the position of a mobile system, The improvement of the GPS position may facilitate new driving functions, which require, for example, precise lane localizations. Furthermore, classic navigation systems may be improved by the method with regard to their accuracy.

According to one exemplary embodiment of the method according to the present invention, the positional probability distribution is ascertained by a GNSS receiver of a vehicle or of a portable device. The mobile systems may be, for example, vehicles, portable devices, or stationarily situated devices. For example, portable devices may also be situated in a stationary way. Furthermore, portable devices may also be situated in a vehicle and used to carry out the method. Navigation devices, mobile radio devices, computers, tablets, and the like may be used as portable devices.

According to another advantageous specific embodiment of the method, the positional probability distribution ascertained by the position estimator is improved by at least one sensor. Each mobile system may use its already present sensors in order to perceive its external surroundings. The sensor data ascertained in this way may be used for improving the positional probability distribution. In the case, for example, of one communicating mobile system perceiving the other or the second mobile system via its sensors, such as a radar or a camera, for example, it may precisely determine the relative position of the GNSS receiver of the second mobile system to its own GNSS receiver and may use this distance and the received GNSS measurements of at least one other mobile system and its own GNSS measurements to estimate the GNSS correction term. The correction term thus ascertained may be shared with all mobile systems in range. This is possible, as it may be assumed that the GNSS error scarcely changes in the near surroundings of the mobile systems.

According to another exemplary embodiment of the method according to the present invention, the at least two mobile systems ascertain a distance to one another or estimate the distance to one another using at least one sensor. For example, the distance of one mobile system to the second mobile system may be ascertained by radar sensors, LIDAR (light detection and ranging) sensors, ultrasound sensors and the like. For this purpose, the distance between the at least two mobile systems may change or remain the same during the measurement.

According to another exemplary embodiment of the method, locally ascertained position data are exchanged through the communication link of the at least two mobile systems and used to calculate the correction term. For example, each mobile system within the communication link may measure or estimate a distance to another mobile system or to a defined object in its surroundings using its own sensors. The mobile system may improve its own positional probability distribution using these sensor data by way of a calculated correction term. The ascertained sensor data or the correction term may be provided to other mobile systems in a defined radius.

According to another advantageous specific embodiment of the method, the communication link is a radio connection. In particular, the communication link may be a mobile radio connection, a wireless vehicle-to-vehicle connection, and the like. For example, UMTS, LTE, WLAN, Bluetooth and the like may be used as the transmission standard.

According to another specific embodiment of the method, a distance from one to another is set for ascertaining the positional probability distribution and the distance by the at least two vehicles. Alternatively or additionally, a defined distance between the mobile systems may be set, for example, by adaptive cruise control, for measuring a distance between the at least two mobile systems. For example, vehicles communicating with one another may automatically adjust their relative distance and their speed so that the calculation of the local correction terms may be optimized. Fixed distance values may thus be assumed for the calculation of the correction terms. For example, cooperative functions of vehicles may be hereby improved. Cooperative functions are designed to automatically carry out potentially critical joint driving maneuvers of multiple vehicles, for example, such as automatic pulling onto an expressway or automatic increasing of gaps in the traffic on a main roadway.

According to another aspect of the present invention, a method is described for providing at least one correction term. The correction term has here been calculated by the method according to the previous aspect of the present invention. In a first step, at least one correction term is transmitted to a central server unit. The transmitted correction term is subsequently assigned to a location or updated to the corresponding location. Depending on a position of a mobile system, a correction term corresponding to the location or the position of the mobile system may be transmitted from the central server unit to the mobile system.

The correction terms, ascertained by a plurality of mobile systems, may be transmitted in real time or at specified time intervals to a central server unit. In addition to the transmitted correction terms, the positions of the respective mobile systems may also be transmitted to the server unit. On the basis of these data, a map may be created which may provide the positionally-dependent correction terms for arbitrary or certain mobile systems. This may be implemented, in particular, by linking the correction terms to the corresponding positions. For example, the method may be used for providing a service for distributing the correction terms to other road users via a central server. The correction terms and the respective positions or positional probability distributions may be transmitted, for example, via a mobile radio network or the internet to the central server unit. A provision of the correction terms to other users or mobile systems may likewise be carried out in the form of wireless data transmission via a cellular network or via a hard-wired communication network. In comparison to DGPS services, local obstacles and shadowing effects, for example, by buildings, may be reduced or preferably prevented by the method. The correction terms stored in the central server unit may be transmitted upon request by mobile systems to the querying mobile systems. In particular, the correction terms may be provided depending on a position of the mobile system. In comparison to classic DGPS systems, no dedicated receiving device is necessary in vehicles or mobile systems, for which reasons the GNSS receiving hardware in vehicles may be kept inexpensive, and the operation of stationary DGPS base stations may be omitted.

According to one advantageous exemplary embodiment of the method, at least one correction term is estimated for at least one second location on the basis of the at least one correction term transmitted for a first location. The limited number of locally valid correction terms or correction terms only valid in one positional point may also be interpolated to other areas of a map. As soon as an estimation or calculation of the GNSS correction terms is carried out, this may be transmitted to the central server. The central server unit collects the correction terms from different mobile systems and uses them in order to form a localized distribution of the GNSS correction terms. Diverse approaches are possible for this. For example, a Gaussian process may be used. A Gaussian process, trained with the transmitted data, may be used to estimate GNSS correction terms for positions, for which no correction terms have been transmitted. The great advantage in using a Gaussian process is that the value it yields, which it provides for the GNSS correction term, is a Gaussian distribution, which also delivers, in addition to the average value, a covariance, thus a quantification number for the quality of the interpolated GNSS correction terms. The chronological change of the correction terms may also be taken into consideration here. This may, for example, be formed in that the covariance of the received correction terms is increased over time, whereby less weight is assigned to them during the training of the Gaussian process. Alternatively, to using a Gaussian process, the considered problem for estimating the local distribution of GNSS correction terms may be perceived as a distributed parametric phenomenon, whose parameters may be ascertained with the aid of a Bayesian estimation.

According to another specific embodiment of the method, the at least one calculated correction term from at least one vehicle is transmitted to the server unit. The mobile systems, which transmit the correction terms and also the respective positions of the correction terms to the central server unit, may preferably be vehicles. The vehicles may, for example, have a wireless Internet connection to the central server unit and transmit and receive the correction terms via this.

According to another specific embodiment of the method, the at least one correction term and at least one position are calculated by at least one distance to at least one landmark. Alternatively or additionally to the previously described approach for cooperative improvement of the GNSS localization with the aid of an estimation of GNSS correction terms and the provision of a map of locally valid GNSS correction terms, static surroundings of a mobile system may advantageously be taken into consideration. For example, passive and stationary landmarks with known positions, such as, for example, radar mirror or optical identifications, such as, for example, ArUco-markers, may be used to ascertain distances and positions to calculate a correction term. Alternatively or additionally, the intrinsic position of a mobile system or vehicle may be determined via triangulation on the basis of the known position of a landmark even without using a GNSS receiver. This position requires no additional correction and may be used, for example, within the context of a communication link with other mobile systems to calculate correction terms.

Preferred exemplary embodiments of the present invention are described in greater detail below by way of highly simplified schematic depictions.

BRIEF DESCRIPTION OF THE DRAWINGS

In the figures, the same design elements respectively have the same reference numerals.

DETAILED DESCRIPTION OF EXAMPLE EMBODIMENTS

Figure 1:
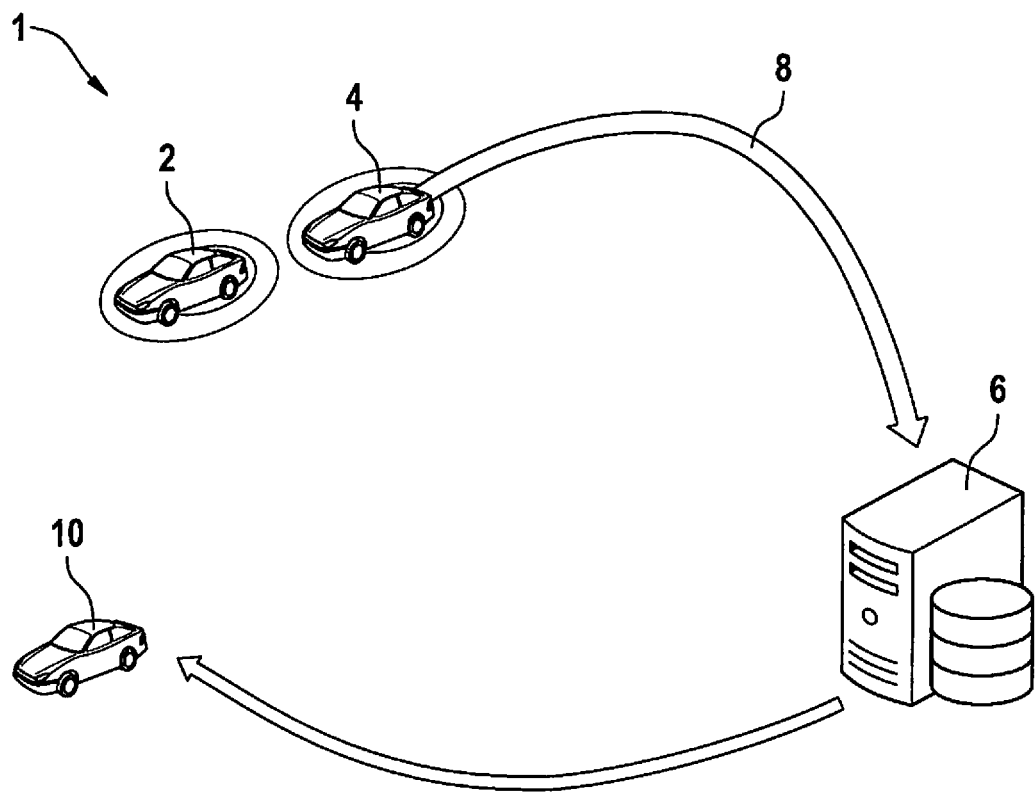
FIG. 1 shows a schematic profile of a method for providing at least one correction term according to a first exemplary embodiment.

FIG. 1 shows a schematic profile of a method 1 for providing at least one correction term according to a first exemplary embodiment. A first mobile system 2 or a first vehicle 2 communicates via a wireless communication link with a second mobile system 4 or a second vehicle 4. Both vehicles 2, 4 have ascertained their respective positional probability distribution as per GNSS. Second vehicle 4 has ascertained its distance 12 to first vehicle 2 with the aid of an adaptive cruise control, and transmitted distance 12 to first vehicle 2. Thus, both vehicles 2, 4 may carry out corrections to their respective positional probability distributions on the basis of their positional probability distribution and the more precisely ascertained distance 12 of both vehicles 2, 4.

According to the exemplary embodiment, vehicle 4 measures the relative position of first vehicle 2 with the aid of onboard sensors. The position of first vehicle 2 may subsequently be determined from the calculated position of second vehicle 4 and the measured relative position. In this case, it was considered that a deviation of the signal propagation speed from the nominal light speed due to atmospheric influences is the only source of error. This assumption is justified, because these types of influences are generally most important. In addition, multipath propagation may also likewise be modeled as a variation of the propagation speed. If $v_1^x$, $v_1^y$, $v_1^z$ are the unknown coordinates of second vehicle 4, $r_2^x$, $r_2^y$, $r_2^z$ are the measured relative position of first vehicle 2, $s_i^x$, $s_i^y$, $s_i^z$ are the coordinates of satellites i, $b_1$ and $b_2$ are the drifts of the local vehicle clocks, $d_{ij}$ is the measured time difference between sending the GNSS signal through satellite j and the reception by vehicle i, and finally, $e_j$ is the deviations of the GNSS signal transmission speed of satellite j from nominal light speed c, then the following system of equations may be generated:

$$\frac{1}{c - e_i} \sqrt{(v_1^x - s_i^x)^2 + (v_1^y - s_i^y)^2 + (v_1^z - s_i^z)^2} + b_1 = d_{1i}$$

$$\frac{1}{c - e_i} \sqrt{(v_1^x + r_2^x - s_i^x)^2 + (v_1^y + r_2^y - s_i^y)^2 + (v_1^z + r_2^z - s_i^z)^2} + b_1 = d_{1i}$$

This system of equations is over-determined for five observed satellites in the case of two vehicles communicating with one another via a communication link and may be solved, for example, with the aid of the least squares method. In principle, the following inequality may be derived $$mn \geq m + n + 3,$$

where m is the number of cooperating vehicles and n is the number of observed satellites. If this inequality is satisfied, then the system of equations formed above is solvable. If, for example, four vehicles cooperate with one another via corresponding communication links, then two satellites may already be sufficient in order to calculate a GNSS position determination and a calculation of the clock drifts of all involved vehicles and the correction terms. If an insufficient number of satellites are observable, then either the correction terms from the previous calculation may be used or the conventional GNSS equations without correction terms may be resorted to. Furthermore, the use of recursive and non-recursive estimating techniques may improve the results.

The ascertained correction terms may be used by vehicles 2, 4 to optimize their position determination and transmitted to a central server unit 6, for example, via an Internet connection 8. The respective positions or the positional probability distribution of vehicles 2, 4 is/are assigned to the calculated correction terms at central server unit 6. A map for correcting positional probabilities may be generated and provided on the basis of a plurality of correction terms and the corresponding positions. For example, depending on a position of another vehicle 10, an already ascertained correction value for optimizing its position determination may be transmitted to this vehicle 10.

Figure 2:
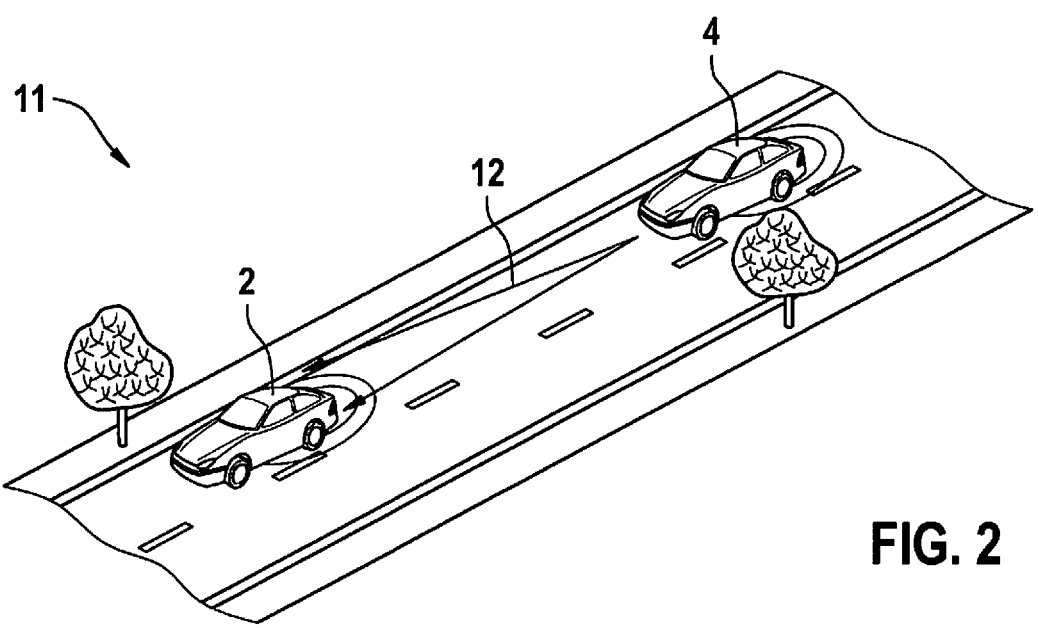
FIG. 2 shows a schematic profile of a method for correcting a positional probability distribution according to a first exemplary embodiment.

A schematic profile of a method 11 for correcting a positional probability according to a first exemplary embodiment is illustrated in FIG. 2. Two vehicles 2, 4 exchange the ascertained positional probabilities among each other via a communication link. Second vehicle 4 measures a distance 12 between first vehicle 2 and second vehicle 4 via a distance sensor. Distance 12 may likewise be transmitted to first vehicle 2 with the aid of the communication link. On the basis of an exact measurement of distance 12, vehicles 2, 4 may improve or calibrate their position ascertainment and limit or optimize the ascertained positional probability distribution.

Figure 3:
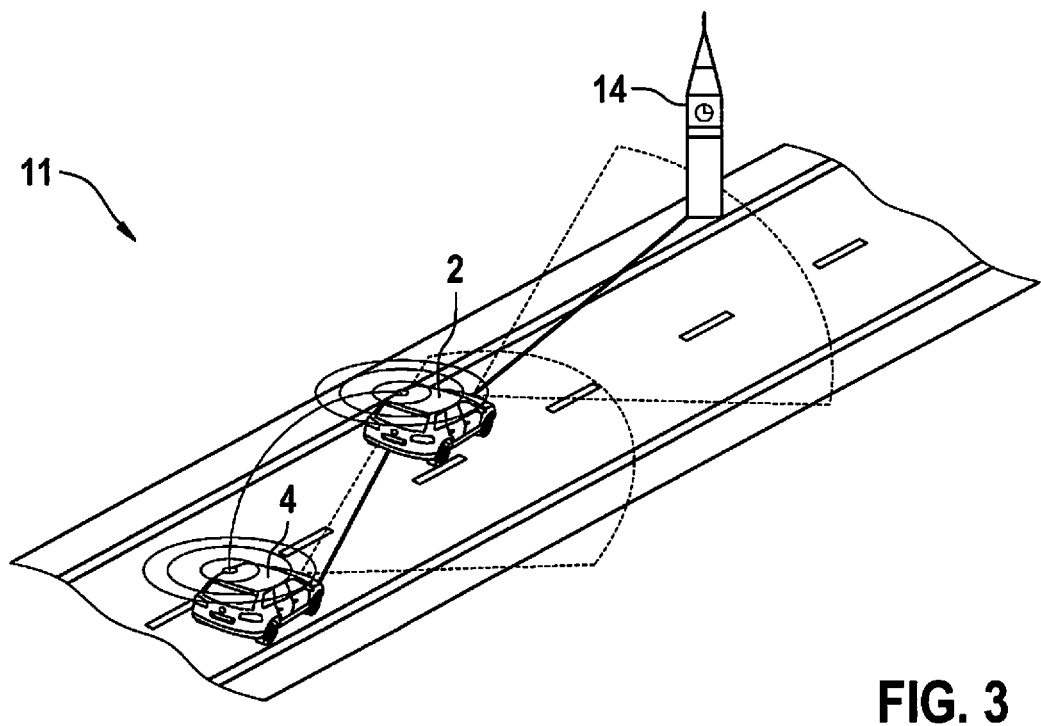
FIG. 3 shows a schematic profile of a method for correcting a positional probability distribution according to a second exemplary embodiment.

A schematic profile of a method for correcting a positional probability is illustrated in FIG. 3 according to a second exemplary embodiment. In this case in particular, a recognized landmark 14 is recognized by first vehicle 2 and a distance between first vehicle 2 and landmark 14 is measured. In this example, second vehicle 4 may not yet recognize landmark 14, because the distance of vehicle 4 to landmark 14 is too large. The distance of landmark 14 to first vehicle 2 may hereby improve the positional probability distribution of first vehicle 2. On the basis of a distance of second vehicle 4 to first vehicle 2 and subsequently the additional distance to landmark 14, second vehicle 4 may also improve its positional probability distribution. In particular, second vehicle 4 may indirectly recognize landmark 14 due to the communication link with first vehicle 2 and thus increase its range.

What is claimed is:

1. A method for correcting a positional probability distribution, comprising:
    ascertaining, by each of at least two mobile systems through respective GNSS receivers, a positional probability distribution;
    ascertaining by at least one of the at least two mobile systems, a distance to at least one mobile system of the at least two mobile systems;
    exchanging, by the at least two mobile systems, the ascertained positional probability distributions among each other through a communication link; and
    carrying out an improvement of the positional probability distributions using the ascertained positional probability distributions and the ascertained distance between the at least two mobile systems;
    wherein each of the at least two mobile systems is for a vehicle, and wherein both vehicles carry out corrections to respective positional probability distributions of the at least two mobile systems based on the positional probability distribution of each of the at least two mobile systems and an ascertained distance between the vehicles.

2. The method as recited in claim 1, wherein the at least two mobile systems include a vehicle or a portable device, and the respective GNSS receivers are GNSS receives of the vehicle or the portable device.

3. The method as recited in claim 1, wherein the ascertained positional probability distributions are improved by at least one sensor.

4. The method as recited in claim 1, wherein the at least two mobile systems ascertain a distance from one to another using at least one sensor or estimate the distance from one to another.

5. The method as recited in claim 1, wherein the at least two mobile systems exchange locally ascertained position data through the communication link and the locally ascertained position data are used for calculating a correction term.

6. The method as recited in claim 1, wherein the communication link is a vehicle-to-vehicle communication link or a radio connection.

7. The method as recited in claim 1, wherein to ascertain the positional probability distributions and the distance, a distance from one to another is set by the at least two vehicles.

8. A method for providing at least one correction term, the method comprising:
    ascertaining, by each of at least two mobile systems through respective GNSS receivers, a positional probability distribution;
    ascertaining by at least one of the at least two mobile system, a distance to at least one mobile system of the at least two mobile systems;
    exchanging, by the at least two mobile systems, the ascertained positional probability distributions among each other through a communication link; and
    ascertaining at least one correcting term for improving the ascertained positional probability distributions, using the ascertained positional probability distributions and the ascertained distance between the at least two mobile systems;
    transmitting the at least one ascertained correction term to a server unit;
    assigning the at least one correction term to a location or renewing the at least one correction term at the location; and
    transmitting the at least one correction term to at least one third mobile system depending on a position of the third mobile system;
    wherein each of the at least two mobile systems is for a vehicle, and wherein both vehicles carry out corrections to respective positional probability distributions of the at least two mobile systems based on the positional probability distribution of each of the at least two mobile systems and an ascertained distance between the vehicles.

9. The method as recited in claim 8, wherein at least one further correction term for at least one second location is estimated based on the at least one transmitted correction term for a first location.

10. The method as recited in claim 8, wherein the at least one ascertained correction term is transmitted to the central server unit from at least one of the at least two mobile systems.

11. The method as recited in claim 8, wherein the at least one correction term is ascertained using at least one positional probability distribution and at least one distance to at least one landmark.

* * * * *